United States Patent
Katou et al.

(10) Patent No.: US 8,665,891 B2
(45) Date of Patent: Mar. 4, 2014

(54) GATEWAY APPARATUS

(75) Inventors: Fusayoshi Katou, Okazaki (JP); Yuzo Harata, Chiryu (JP); Takeshi Enosaki, Nagoya (JP); Mitsuyoshi Natsume, Hekinan (JP); Hiroyuki Kishi, Takahama (JP)

(73) Assignee: Denso Corporation, Kariya (JP)

( * ) Notice: Subject to any disclaimer, the term of this patent is extended or adjusted under 35 U.S.C. 154(b) by 117 days.

(21) Appl. No.: 13/493,026

(22) Filed: Jun. 11, 2012

(65) Prior Publication Data

US 2012/0320927 A1   Dec. 20, 2012

(30) Foreign Application Priority Data

Jun. 15, 2011   (JP) .................. 2011-133234

(51) Int. Cl.
*H04L 12/28*   (2006.01)
(52) U.S. Cl.
USPC .......................................................... 370/401
(58) Field of Classification Search
USPC ......... 370/401, 412, 413, 352, 353, 354, 355, 370/356, 389, 392
See application file for complete search history.

(56) References Cited

U.S. PATENT DOCUMENTS

| | | | |
|---|---|---|---|
| 7,787,479 B2 * | 8/2010 | Matsuo et al. | 370/401 |
| 2010/0231354 A1 | 9/2010 | Nishiguchi et al. | |

FOREIGN PATENT DOCUMENTS

| | | |
|---|---|---|
| JP | 05-187698 | 7/1993 |
| JP | 2002-077196 | 3/2002 |
| JP | 0210-028793 | 2/2010 |
| JP | 2010-28793 | 2/2010 |
| JP | 2010-103648 | 5/2010 |
| JP | 2010-219628 | 9/2010 |
| JP | 2010-251837 | 11/2010 |

OTHER PUBLICATIONS

Office Action issued Jun. 11, 2013 in corresponding Japanese Application No. 2011-133234 (with English translation).
Office Action issued Sep. 10, 2013 in corresponding JP Application No. 2011-133234 (with English translation).

* cited by examiner

*Primary Examiner* — Chi Pham
*Assistant Examiner* — Alexander O Boakye
(74) *Attorney, Agent, or Firm* — Harness, Dickey & Pierce, PLC

(57) ABSTRACT

A gateway apparatus performs frame forwarding between an external device connected to a first bus and controllers connected to a second bus. Each controller outputs a response frame upon reception of a communication frame from the external device. The response frame has an address field in which a private address is set. The private address is uniquely assigned to each controller in a private network space defined by the second bus. When the communication frame is directed to each controller, the communication frame is forwarded to each controller in sequence at different times to prevent collision between the response frames in the second bus. The private address set in the address field of the response frame is converted into a predetermined transmitting address specified in the first bus.

3 Claims, 6 Drawing Sheets

FIG. 2

| ADDRESS FIELD | DATA FIELD | |
|---|---|---|
| CANID (11bit) | N_TA (1byte) | Data (1byte~) |

FIG. 3

| ADDRESS FIELD | DATA FIELD |
|---|---|
| CANID (11bit) | Data (1byte~) |

GATEWAY APPARATUS

CROSS REFERENCE TO RELATED APPLICATION

This application is based on Japanese Patent Application No. 2011-133234 filed on Jun. 15, 2011, the disclosure of which is incorporated herein by reference.

TECHNICAL FIELD

The present disclosure relates to a gateway apparatus for forwarding communication frames between an external device connected to a first communication bus network and control units connected to a second communication bus network.

BACKGROUND

As disclosed in, for example, JP-A-2010-251837, a gateway apparatus for forwarding data frames between vehicle control units is known.

A vehicle is equipped with a lot of control units that control the vehicle. Various types of data are transmitted and received between the control units. An external diagnostic tool is connected to a vehicle network to perform a diagnostic communication with the control units. In the diagnostic communication, the diagnostic tool controls the control units and collects data from the control units.

Such data communication is performed using communication frames specified in communication standards such as controller area network (CAN) communications. For example, in the CAN communications, as shown in FIG. 7, a CAN identifier (ID) is assigned to each of nodes including a diagnostic tool, a gateway apparatus, an ECU1, and an ECU2. Specifically, the CAN ID is assigned for a receiving functional address Rx(F), a receiving physical address Rx(P), and a transmitting address Tx. The receiving functional address Rx(F) is set in a communication frame to transmit the communication frame to multiple nodes simultaneously. The receiving physical address Rx(P) is set in a communication frame to transmit the communication frame to a specific node. That is, the receiving functional address Rx(F) is a broadcast address, and the receiving physical address Rx(P) is a unicast address.

For example, when the diagnostic tool transmits data to the ECU1 and the ECU2 simultaneously, a CAN ID assigned as the receiving functional address Rx(F) is set in an address field of the communication frame. When the diagnostic tool transmits data to a specific ECU, a CAN ID assigned as the receiving physical address Rx(P) is set in the address field of the communication frame. When the ECU1 and the ECU2 transmits data to the diagnostic tool, a CAN ID assigned as the transmitting address is set in the address field of the communication frame.

As vehicles have become increasingly sophisticated, the number of ECUs mounted in vehicles has been increased. However, since the number of addresses assignable to each node is limited according to communication standards, the number of addresses assigned to each node may be not enough. For example, in CAN diagnostic communications, multiple diagnostic tools may be connected to a vehicle network. In such a case, as the number of diagnostic tools connected to the vehicle network increases by one, the number of usable addresses decreases by half. Therefore, it is difficult to assign enough number of addresses to each node.

For the above reasons, as shown in FIG. 7, when a communication frame is transmitted through a conventional gateway apparatus from the diagnostic tool to the ECU1 and the ECU2 simultaneously, the gateway apparatus prevents the ECU1 and the ECU2 from transmitting a response frame to the diagnostic tool.

In the light of communication quality, it is preferable that a unique transmitting functional address be assigned to each of the ECU1 and the ECU2 so that the ECU1 and the ECU2 can transmit the response frame to the diagnostic tool by setting the transmitting functional address in an address field of the response frame. However, in this case, collision may occur between the response frames transmitted by the ECU1 and the ECU2.

SUMMARY

It is an object of the present disclosure to provide a gateway apparatus for correctly forwarding response frames from control units to an external device when the external device transmits a communication frame to the control units simultaneously.

According to an aspect of the present disclosure, a gateway apparatus performs frame forwarding between an external device connected to a first communication bus network and a plurality of controllers connected to a second communication bus network. Each controller is configured to receive a communication frame from the external device and outputs a response frame upon reception of the communication frame. The response frame has an address field in which a private address is set. The private address is uniquely assigned to each controller in a private network space defined by the second communication bus network. The gateway apparatus includes a first transmitter and a second transmitter. The first transmitter is configured to forward the communication frame from the first communication bus network to the second communication bus network. The second transmitter is configured to forward the response frame from the second communication bus network to the first communication bus network. When the communication frame is directed to each controller, the first transmitter forwards the communication frame to each controller in sequence at different times to prevent collision between the response frames in the second communication bus network. The second transmitter converts the private address set in the address field of the response frame into a predetermined transmitting address specified in the first communication bus network.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram illustrating a CAN extended frame format;

FIG. 3 is a diagram illustrating a CAN standard frame format;

DETAILED DESCRIPTION

Embodiment

Figure 1:
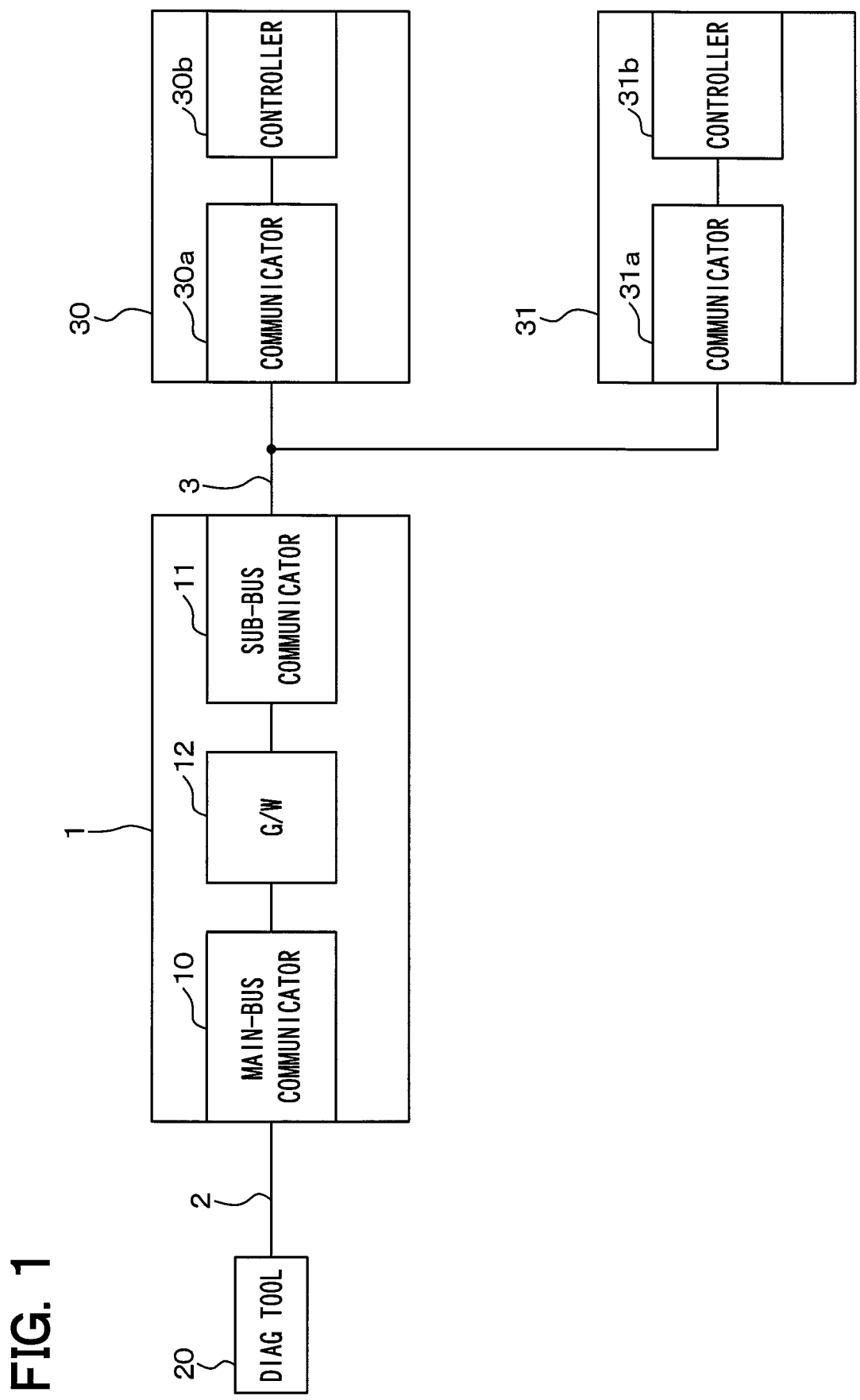
FIG. 1 is a block diagram of a gateway apparatus according to an embodiment of the present disclosure.

FIG. 1 illustrates a block diagram of a gateway apparatus 1 according to an embodiment of a present disclosure. The gateway apparatus 1 includes a CAN communicator 10 for a main bus 2, a CAN communicator 11 for a sub bus 3, and a gateway processor (G/W) 12. The gateway apparatus 1 forwards communication frames between an external diagnostic tool 20 connected to the main bus 2 and electronic controls units (ECUs) 30 and 31 connected to the sub bus 3. In an example shown in FIG. 1, one diagnostic tool 20 is connected to the main bus 2, and two ECUs 30 and 31 are connected to the sub bus 3. However, two or more diagnostic tools can be connected to the main bus 2, and three or more ECUs can be connected to the sub bus 3.

The CAN communicator 10 controls communication with the diagnostic tool 20 connected to the main bus 2.

The diagnostic tool 20 diagnoses the ECUs 30 and 31. The diagnostic tool 20 controls the ECUs 30 and 31 and collects information from the ECUs 30 and 31.

The gateway apparatus 1 and the diagnostic tool 20 communicate with each other by using a CAN extended frame format. In the CAN extended frame format, a standard address (i.e., CAN ID) is set in an address field, and an extended address is set in a portion of a data field different from the address field.

FIG. 2 illustrates the CAN extended frame format. As shown in FIG. 2, the CAN extended frame format has a 11-bit address field and a data field.

In the CAN extended format, the first 1 byte of the data field is used as an extended address portion. An extended address "NTA" is set in the extended address portion of the data field, and data "Data" is set in the remaining portion of the data field. The address field and the extended address portion are used to identify a transmitting node.

The CAN communicator 11 controls communication with the ECUs 30 and 31 connected to the sub bus 3. The ECUs 30 and 31 control a vehicle. Examples of the ECUs 30 and 31 can include an engine ECU, a brake ECU, and a door ECU.

The gateway apparatus 1 and the ECUs 30 and 31 communicate with each other by using a CAN standard frame format. In the standard frame format, a standard address (i.e., CAN ID) is set in an address field.

FIG. 3 illustrates the CAN standard frame format. As shown in FIG. 3, the CAN standard frame format has a 11-bit address field and a data field. The CAN ID is set in the address field, and data "Data" is set in the data field. The address field is used to identify a transmitting node.

Although not shown in the drawings, the gateway processor 12 is configured as a computer having a CPU, a RAM, a ROM, and an arbitration buffer. An address mapping table, which is described later, is stored in the ROM. The CPU executes instructions from programs stored in the ROM.

The ECU 30 includes a CAN communicator 30a and a controller 30b. The ECU 31 includes a CAN communicator 31a and a controller 31b.

Each of the CAN communicators 30a and 31a controls communication with the gateway apparatus 1, which is connected through the sub bus 3 to the ECUs 30 and 31.

Each of the controllers 30b and 31b is configured as a computer having a CPU, a RAM, a ROM, and an I/O. The CPU executes instructions from programs stored in the ROM.

Figure 4:
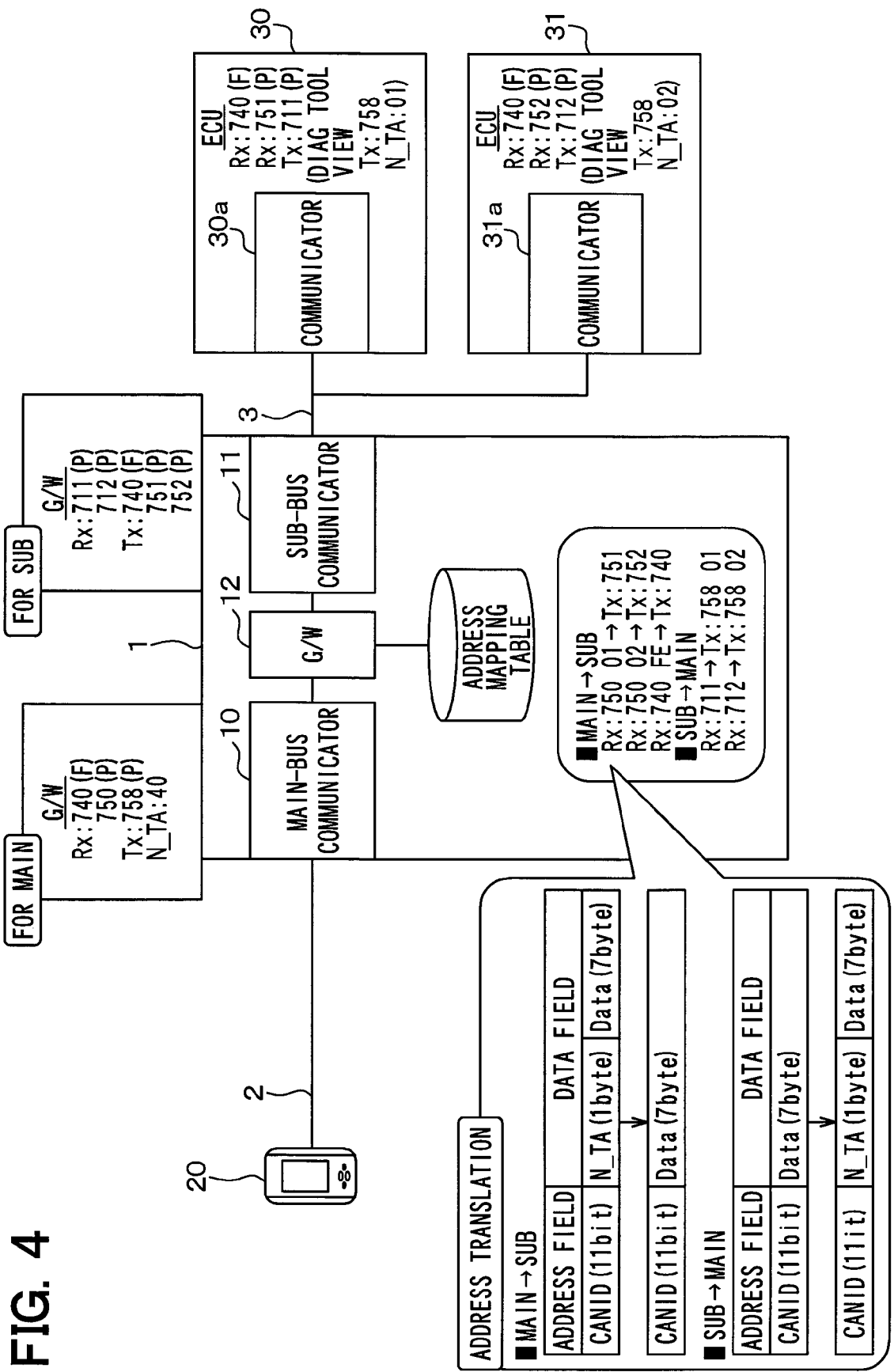
FIG. 4 is a diagram illustrating how to assign CAN IDs to nodes.

FIG. 4 is a diagram illustrating how to assign CAN IDs to the gateway apparatus 1 and the ECUs 30 and 31.

As shown in FIG. 4, a main bus address for the main bus 2 and a sub bus address for the sub bus 3 are separately assigned to the gateway apparatus 1. The sub bus address is a private address uniquely assigned in a private address space defined by the sub bus 3. A receiving address includes a receiving functional address used to transmit data to a specific node and a receiving physical address used to transmit data to all nodes simultaneously.

The main bus address assigned to the gateway apparatus 1 includes a receiving functional address Rx:740(F), a receiving physical address Rx:750(P), a transmitting physical address Tx:758(P), and an extended address N_TA:40. It is noted that theses addresses are given in hexadecimal.

The sub bus address assigned to the gateway apparatus 1 includes a receiving functional address Rx:711(F), a receiving physical address Rx:712(P), a transmitting functional address Tx:740(F), a first transmitting physical address Tx:751(P), and a second transmitting physical address Tx:752(P). It is noted that theses addresses are given in hexadecimal.

In contrast, only a sub bus address is assigned to each of the ECUs 30 and 31. The sub bus address assigned to the ECU 30 includes a receiving functional address Rx:740(F), a receiving physical address Rx:751(P), a transmitting physical address Tx:711(P), and an extended address N_TA:01. It is noted that theses addresses are given in hexadecimal.

The sub bus address assigned to the ECU 31 includes a receiving functional address Rx:740(F), a receiving physical address Rx:752(P), a transmitting physical address Tx:712 (P), and an extended address N_TA:02. It is noted that theses addresses are given in hexadecimal.

Further, a transmitting physical address is uniquely assigned to each of the ECUs 30 and 31. Specifically, the ECU 30 has an unique transmitting physical address Tx:711(P), and the ECU 31 has an unique transmitting physical address Tx:712(P).

When the gateway processor 12 forwards a communication frame from the main bus 2 to the ECUs 30 and 31, the gateway processor 12 converts the address of the communication frame by referring to the address mapping table. Likewise, when the gateway processor 12 forwards a communication frame from the sub bus 3 to the diagnostic tool 20, the gateway processor 12 converts the address of the communication frame by referring to the address mapping table.

Firstly, an address conversion from the extended frame format to the standard frame format, which is performed when a communication frame is forwarded from the main bus 2 to the ECUs 30 and 31, is described.

In a communication frame transmitted from the diagnostic tool 20 to the ECU 30, Rx:750(P) is set as a standard address, and N_TA:01 is set as an extended address. In this case, the standard address of the communication frame is converted into the transmission physical address Tx:751(P). This address conversion allows the communication frame to be forwarded from the diagnostic tool 20 to the ECU 30.

In a communication frame transmitted from the diagnostic tool 20 to the ECU 31, Rx:750(P) is set as a standard address, and N_TA:02 is set as an extended address. In this case, the standard address of the communication frame is converted into the transmission physical address Tx:752(P). This address conversion allows the communication frame to be forwarded from the diagnostic tool 20 to the ECU 31.

In a communication frame transmitted from the diagnostic tool 20 to the ECUs 30 and 31 simultaneously, Rx:740(F) is set as a standard address, and N_TA: FE is set as an extended address. In this case, the standard address of the communication frame is converted into the transmission physical address Tx:740(P). This address conversion allows the communication frame to be forwarded from the diagnostic tool 20 to the ECUs 30 and 31 simultaneously.

Next, an address conversion from the standard frame format to the extended frame, which is performed when a communication frame is forwarded from the sub bus 3 to the diagnostic tool 20, is described.

In a communication frame transmitted from the ECU 30 to the diagnostic tool 20, Rx:711(P) is set as a standard address. In this case, the standard address of the communication frame is converted so that Tx:758(P) is set as a standard address and that N_TA:01 is set as an extended address. This address conversion allows the communication frame to be forwarded from the ECU 30 to the diagnostic tool 20.

In a communication frame transmitted from the ECU 31 to the diagnostic tool 20, Rx:712(P) is set as a standard address. In this case, the standard address of the communication frame is converted so that Tx:758(P) is set as a standard address and that N_TA:02 is set as an extended address. This address conversion allows the communication frame to be forwarded from the ECU 31 to the diagnostic tool 20.

Thus, the diagnostic tool 20 can recognize that the gateway apparatus 1 has a transmitting physical address Tx:758(P) and N_TA:40, that the ECU 30 has a transmitting physical address Tx:758(P) and N_TA:01, and that the ECU 31 has a transmitting physical address Tx:758(P) and N_TA:02.

Figure 5:
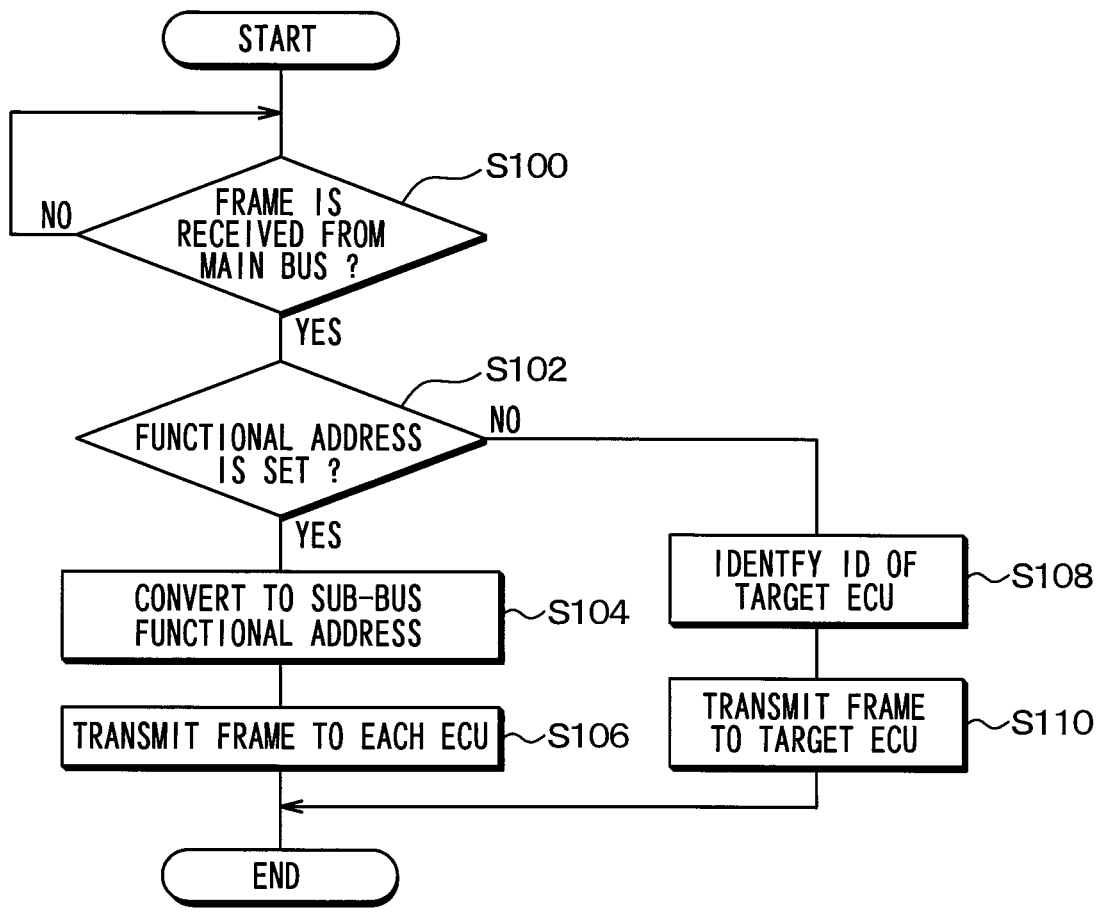
FIG. 5 is a flow diagram of a first control process performed by the gateway apparatus to forward a communication frame from a main bus to a sub bus.

Next, a first control process performed by the gateway processor 12 to forward a communication frame from the main bus 2 to the ECUs 30 and 31 is described below with reference to FIG. 5.

The first control process starts at S100, where the gateway processor 12 determines whether it receives a communication frame from the main bus 2. If the gateway processor 12 does not receive the communication frame from the main bus 2 corresponding to NO at S100, the first control process repeats S100.

In contrast, if the gateway processor 12 receives the communication frame from the main bus 2 corresponding to YES at S100, the first control process proceeds to S102. At S102, the gateway processor 12 determines whether an address set in the communication frame is a functional address. Specifically, the gateway processor 12 determines whether a CAN ID assigned as a functional address is set as a standard address in the communication frame.

If a CAN ID assigned as a functional address is set as a standard address in the communication frame corresponding to YES at S102, the first control process proceeds to S104. At S104, the gateway processor 12 converts the address of the communication frame into a sub-bus functional address by using the address mapping table. The sub-bus functional address is a private address used in a private network defined by the sub bus 3.

Then, the first control process proceeds from S104 to S106, where the gateway processor 12 transmits the communication frame having the sub-bus functional address to the ECUs 30 and 31. It is noted that the gateway processor 12 transmits the communication frame to the ECUs 30 and 31 in sequence at different times to prevent collision between response frames transmitted from the ECUs 30 and 31 to the sub bus 3 in response to the communication frame. According to the embodiment, the gateway processor 12 initially transmits the communication frame to the ECU 30. Then, when the gateway processor 12 receives the response frame from the ECU 30, the gateway processor 12 transmits the communication frame to the ECU 31. In such an approach, the collision between the response frames in the sub bus 3 can be prevented. After S106, the first control process is finished.

In contrast, if a CAN ID assigned as a physical address is set as a standard address in the communication frame corresponding to NO at S102, the first control process proceeds to S108. At S108, the gateway processor 12 identifies a CAN ID of a target ECU. The CAN ID of the target ECU can be identified from a standard address and an extended address set in the communication frame.

Then, the first control process proceeds from S108 to S110, where the gateway processor 12 transmits the communication frame to the identified target ECU. After S110, the first control process is finished.

As described above, each of the ECUs 30 and 31 connected to the sub bus 3 transmits the response frame to the diagnostic tool 20 when receiving the communication frame from the diagnostic tool 20. A unique private transmitting address used in a private network defined by the sub bus 3 is set in an address field of the response frame.

The gateway processor 12 forwards the response frame from the sub bus 3 to the diagnostic tool 20.

Figure 6:
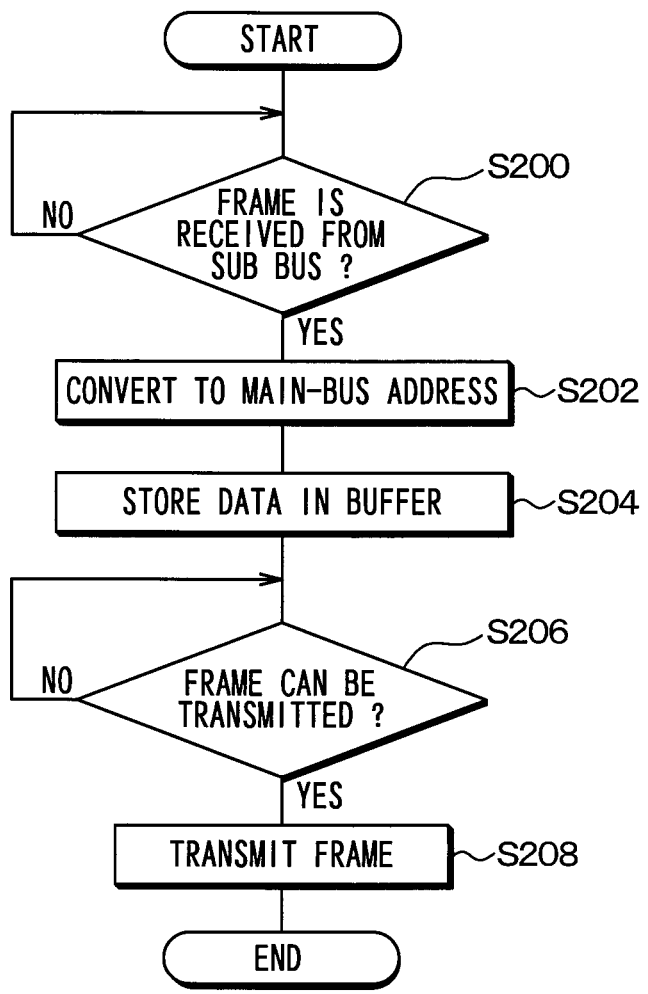
FIG. 6 is a flow diagram of a second control process performed by the gateway apparatus to forward the communication frame from the sub bus to the main bus.
Figure 7:
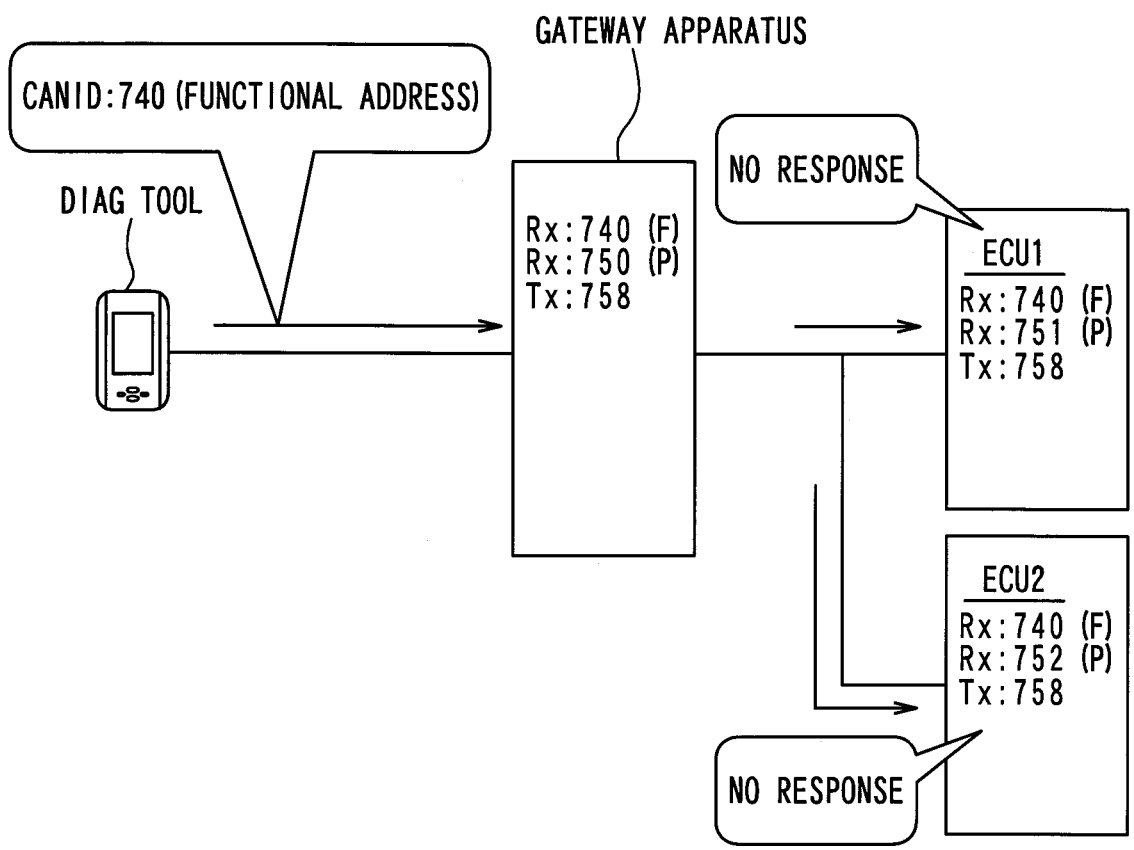
FIG. 7 is a diagram illustrating a conventional gateway apparatus.

A second control process performed by the gateway processor 12 to forward the response frame from the sub bus 3 to the diagnostic tool 20 is described below with reference to FIG. 6.

The second control process starts at S200, where the gateway processor 12 determines whether it receives a response frame from the sub bus 3. If the gateway processor 12 does not receive the response frame from the sub bus 3 corresponding to NO at S200, the second control process repeats S200.

In contrast, if the gateway processor 12 receives the response frame from the sub bus 3 corresponding to YES at S200, the second control process proceeds to S202. At S202, the gateway processor 12 converts an address set in the response frame into a main-bus address specified in a communication standard of the main bus 2. When the diagnostic tool 20 transmits the communication frame to the ECUs 30 and 31 simultaneously, the gateway processor 12 receives the response frame from the ECUs 30 and 31 in sequence and performs the address conversion on the received response frame in sequence. In the address conversion, a common transmitting address is set in the address field of the response frame, and a unique extended address (N_TA) to identify the ECU that transmits the response frame is set in the extended address portion of the data field of the response frame.

Then, the second control process proceeds to S204, where the gateway processor 12 stores the response frame having the address converted at S202 in the arbitration buffer. Thus, even when a lot of response frames are sequentially transmitted from multiple ECUs to the diagnostic tool 20, the gateway processor 12 can stably perform the address conversion.

Then, the second control process proceeds to S206, where the gateway processor 12 determines whether the response frame can be transmitted. If the response frame can be transmitted corresponding to YES at S206, the second control process proceeds to S208. At S208, the gateway processor 12 transmits the response frame. Specifically, at S208, the gateway processor 12 transmits the response frames stored in the arbitration buffer in sequence in a predetermined order. After S208, the second control process is finished.

Thus, the diagnostic tool 20 sequentially receives a response frame having an address field, where a common transmitting address is set, and a data field, where a unique extended address (N_TA) to identify the ECU that transmits the response frame is set.

The diagnostic tool 20 identifies which ECU transmits a response frame based on the unique extended address (N_TA) set in the response frame. Further, since the common transmitting address is set in the address field, a lack of available addresses can be prevented irrespective of the number of ECUs that transmit the response frame to the diagnostic tool 20.

In contrast, if the response frame cannot be transmitted, for example, due to communication errors, corresponding to NO at S206, the second control process repeats S206.

As described above, according to the embodiment, each of the ECUs 30 and 31 outputs a response frame when receiving a communication frame from the diagnostic tool 20. An address set in an address field of the response frame is a unique private transmitting address used in a private network defined by the sub bus 3. When the gateway processor 12 receives a communication frame from the diagnostic tool 20 and determines that the communication frame is transmitted to the ECUs 30 and 31 simultaneously, the gateway processor 12 forwards the communication frame to the ECUs 30 and 31 in sequence at different times to prevent collision between the response frames outputted from the ECUs 30 and 31 to the sub bus 3. In contrast, when the gateway processor 12 receives the response frame from the ECUs 30 and 31, the gateway processor 12 performs address conversion in which the private transmitting address set in the response frame is converted into a transmitting address specified in a communication standard of the main bus 2. In such an approach, for example, even when the number of ECUs connected to the sub bus 3 is increased, a unique transmitting address can be assigned to each ECU. Further, since the gateway processor 12 forwards the communication frame to the ECUs 30 and 31 in sequence at different times, collision between the response frames in the sub bus 3 is prevented so that the response frames can be correctly forwarded to the diagnostic tool 20.

Further, according to the embodiment, in the address conversion performed by the gateway processor 12, a common transmitting address is set in an address field of the response frame, and a unique extended address to identify which ECU transmits the response frame is set in a predetermined field, different from the address field, of the response frame. In such an approach, the diagnostic tool 20 can identify which ECU transmits the response frame based on the extended address.

(Modification)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, in the embodiment, the gateway apparatus 1 and the diagnostic tool 20 communicate with each other by using a CAN extended frame format, in which a standard address is set in an address field, and an extended address is set in a data field. Alternatively, the gateway apparatus 1 and the diagnostic tool 20 can communicate with each other by using a CAN standard frame format, in which a standard address is set in an address field. In this case, in the address conversion performed by the gateway processor 12, although a common transmitting address is set in the address field of the response frame, a unique extended address is not set in the response frame. Therefore, the diagnostic tool 20 cannot identify which ECU transits the response frame.

In addition to the CAN standard frame format and the CAN extended frame format, a CAN 29-bit frame format with a 29 bit identifier can be employed. In this case, a combination of frame formats used in the respective buses 2 and 3 can be as follows:

(1) main bus 2: extended, sub bus 3: standard
(2) main bus 2: extended, sub bus 3: 29-bit
(3) main bus 2: standard, sub bus 3: extended
(4) main bus 2: standard, sub bus 3: 29-bit
(5) main bus 2: 29-bit, sub bus 3: extended
(6) main bus 2: 29-bit, sub bus 3: standard In the embodiment, the diagnostic tool 20 as an external device is connected to the main bus 2. The external device connected to the main bus 2 is not limited to a diagnostic tool.

The gateway processor 12 can serve as a first transmitter by performing S106 and can serve as a second transmitter by performing S202 and S208.

What is claimed is:

1. A gateway apparatus for performing frame forwarding between an external device connected to a first communication bus network and a plurality of controllers connected to a second communication bus network, each controller configured to receive a communication frame from the external device and output a response frame upon reception of the communication frame, the response frame having an address field in which a private address is set, the private address uniquely assigned to each controller in a private network space defined by the second communication bus network, the gateway apparatus comprising:
   a first transmitter configured to forward the communication frame from the first communication bus network to the second communication bus network; and
   a second transmitter configured to forward the response frame from the second communication bus network to the first communication bus network, wherein
   when the communication frame is directed to each controller, the first transmitter forwards the communication frame to each controller in sequence at different times to prevent collision between the response frames in the second communication bus network, and
   the second transmitter converts the private address set in the address field of the response frame into a predetermined transmitting address specified in the first communication bus network.

2. The gateway apparatus according to claim 1, wherein
   the communication frame and the response frame transmitted between the gateway apparatus and the external device has an extended frame format in which a standard address is set in the address field and an extended address is set in an extended field that is different from the address field,
   the second transmitter converts the private address so that the standard address is set in the address field and that the extended address is set in the extended field,
   the standard address is assigned commonly to each controller, and
   the extended address is assigned uniquely to each controller.

3. The gateway apparatus according to claim 1, wherein
   the communication frame and the response frame transmitted between the gateway apparatus and the external device has a standard frame format in which a standard address is set in the address field, the second transmitter converts the private address so that the standard address is set in the address field, and the standard address is assigned commonly to each controller.

* * * * *